Aug. 22, 1939.　　　　J. GREAKER　　　　2,170,404

ARTILLERY TYPE WHEEL FOR VEHICLES

Filed April 13, 1937

INVENTOR:
JOSEF GREAKER
BY Haseltine Lake & Co.
ATTORNEYS

Patented Aug. 22, 1939

2,170,404

UNITED STATES PATENT OFFICE 2,170,404

ARTILLERY TYPE WHEEL FOR VEHICLES

Josef Greaker, Skien, Norway

Application April 13, 1937, Serial No. 136,541
In Norway April 15, 1936

2 Claims. (Cl. 301—16)

The present invention relates to a wheel of the artillery type for vehicles and especially that type of wheel which may be taken apart in order to remove the tire from the rim. A wheel construction according to this invention is very advantageous for use on heavy motor vehicles, such as trucks and busses where pneumatic tires of large dimensions are used and where the removing of the tire for replacing the same usually includes quite a bit of heavy work which takes a long time and requires considerable skill.

The wheel according to this invention is constructed basically in that way that the spokes by means of mechanisms included in the hub are held as two-armed levers which may swing about a fulcrum in a plane parallel to or through the axis of the shaft, the inner end of the spokes being connected to or having steering in a sleeve, ring or similar mechanism which is adapted to be moved on the shaft passing through the hub in the direction of the axis of the said shaft in such a way that the spokes from a position substantially normal to the axis of the shaft may be tilted to form another angle with the same axis in such a way that a number of spokes together will form a cone, whereby the rim may easily be removed from the outer end of the spokes.

In a preferred embodiment of the invention, this adjustment of the spokes is done by means of a hollow hub or flange construction in which the spokes are held, which hub construction comprises mechanisms adjustable in relation to each other in such a way that a swinging action of the spokes may be obtained.

The invention will in the following be described with reference to the drawing, illustrating a preferred embodiment of the invention. In the drawing.

Figure 1:
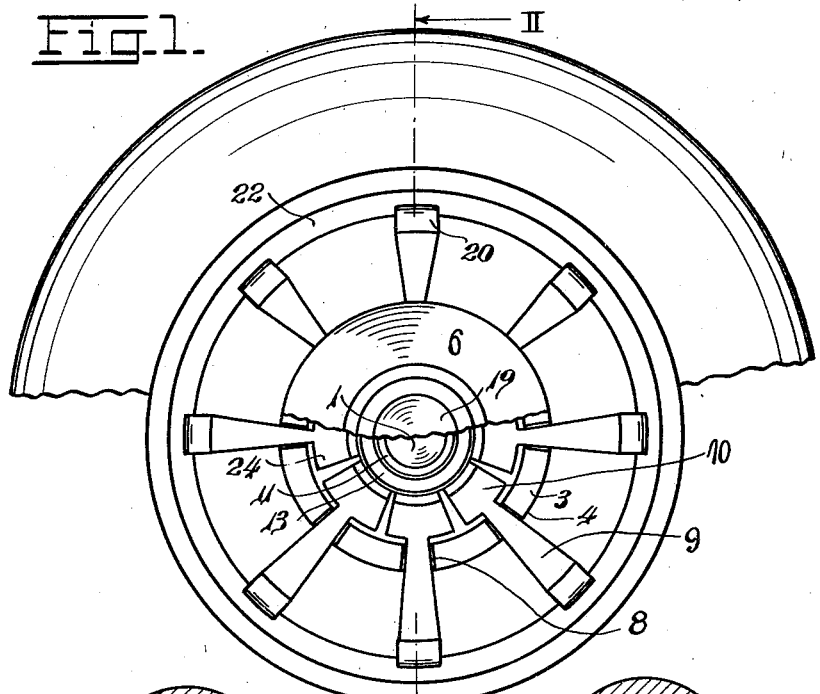
Fig. 1 illustrates a wheel partly in cross section and provided with a pneumatic tire, all according to this invention.

In the drawing, 1 represents the shaft which is journalled in a bearing 2, carried by the frame of the vehicle in a suitable way. On the shaft is carried a flange 3, the outer surface 4 of which may be used as a brake drum. The flange 3 has a conical hollow or well 5 and is on the outside covered by a disk 6, the said shaft 1 being extended through the said flange and projecting outside the same in the form of exteriorly threaded end 7. In the flange 3 radially extending slots 8 are arranged, adapted to receive the spokes 9, each of which is provided with a sector portion 10, which in combination with the other spokes together will form a circle plate substantially corresponding to the dimensions of the well 5 in the flange 3. On the shaft 1 is slidably but not rotatably, held a sleeve 11, the inner end of which may be conically shaped as shown at 12, another sleeve or ring 13 being mounted on this conical part of the sleeve 11, said ring 13 being provided with an annular slot 14 adapted to receive the inner ends 15 of the spokes 9. When the spokes are arranged in position, as will be seen in Fig. 1, where the disk 6 is partly cut away, they cannot slide out to the side as they are retained by their shoulders 24 within flange 3 and their angular position with reference to the shaft 1 is determined by the position of the ring 13 on the shaft with respect to the fulcrum edge 25 of flange 3. The outer end of the sleeve 11 is provided with external threads, and the ring 13 is prevented from undesired movements in the axial direction by means of a stop ring 16 which is screwed in upon the exterior thread 23 of the sleeve, or may be secured by having interiorly located studs meshing with studs on said sleeve.

By means of the mechanism above described, one may adjust the angular position of the spokes with relation to the axis of the shaft in the following way: Assuming that one starts with the parts in the position shown in Fig. 3 and enters a nut 17 on the external threads on the sleeve 11, tightening said nut, then the sleeve will pull the ring 13 and the spokes 9 will pivot about the mentioned fulcrum edge 25 of the flange 13, taking a position corresponding to that shown in Fig. 2. The outer ends of the spokes have then moved outwardly in radial direction, at the same time as the ring 13 when it comes into contact with the disk 6, is forced against the conical part 12 of the sleeve 11, and as this sleeve may be provided with axially extending slots 18, the sleeve will be clamped to the shaft 1, thereby adding to the stability of the whole construction. After this tightening action has been completed, one may add a nut 19 on to the external threads on the shaft 1, and if these two threads respectively on the sleeve and on the shaft have been chosen respectively left and right, the two nuts 17 and 19 will lock each other in position.

Figure 2:
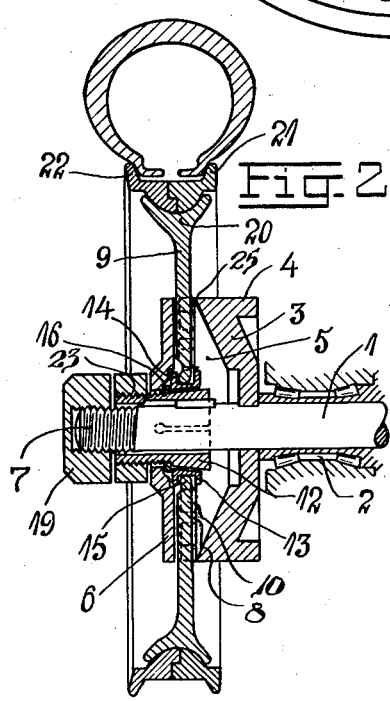
Fig. 2 is a cross section at the line II—II in Fig. 1, the parts not being clamped tight but slightly separated for clearness of disclosure.
Figure 3:
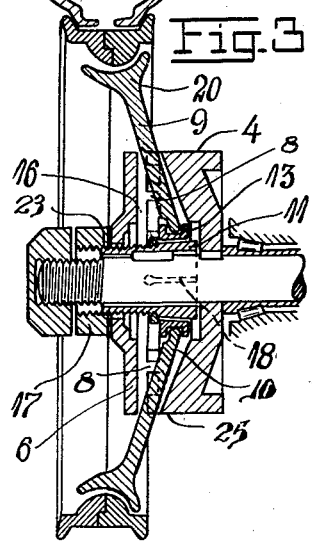
Fig. 3 is a corresponding cross section where the spokes have been tilted to a position in which the rim may be removed from the spokes.

If it is desired to transfer the spokes from the position shown in Fig. 2 to the position shown in Fig. 3, the first thing to do is to loosen the nut 19 and thereafter the nut 17 to some extent. Then the nut 19 is tightened again, which will cause the sleeve 11 to be pushed inwardly, thereby acting on the ends of the spokes, causing these to tilt so that they will take the position shown in Fig. 3.

At the outer end the spokes 9 are provided with forklike shoes 20 which are constructed in such a way that they will correspond in shape with the inside configuration of the rim, which may be constructed of two individual parts 21 and 22. In the position shown in Fig. 3, the rim may without hindrance be brought in position on the spokes and is not prevented from moving axially outwardly by the forks on the ends of the spokes. When the rim has been brought in position as shown in Fig. 3, the spokes are tilted back into the position shown in Fig. 2 in the way above described, and the forks 20 will thereby be forced in frictional contact around the two parts of the rim 21 and 22 and the wheel construction in general may be locked in position by means of the two nuts 17 and 19.

From the above description in connection with the drawing it will be understood that by means of the construction according to this invention an especially suitable and simple mechanism has been provided, which to a great extent will simplify the work in replacing pneumatic tires, due to the fact that the rim may easily be mounted on the pneumatic tire, whereafter this complete construction may be placed in position in contact with the spokes, and finally the spokes may be tilted into their locked position as shown in Fig. 3.

With this construction one will not run any risk or danger due to broken bolts or loose nuts which in the usual construction is a common drawback in the attachment of the rim to the wheel, due to the fact that one will immediately observe any loose connection which may arise due to undesired turning of the nuts 17 and 19.

I claim:

1. An artillery type wheel comprising a shaft, a sleeve on said shaft, mounted for sliding movement in the axial direction, external threads on one end of the said sleeve and the said shaft, a nut on the thread of the sleeve and a second or outer nut on the end of the said shaft adapted to contact with the outer surface of said nut on the thread on said sleeve, a circular disk mounted freely on the said sleeve and adapted to contact with the inner surface of the nut on the said sleeve, a conical surface portion having its diameter increasing inwardly being disposed on the other end of the said sleeve and an axial slot in the same, a ring with an annular groove and internal conical surface mounted on the said sleeve on the conical end of the same, spokes adapted to rest with their inner ends in the said groove in the said ring and with one side of each disposed against the said disk, a flange member comprising concentrically arranged fulcrum edges fixed to the said shaft and adapted to contact with the spokes upon the other side of each in radial alignment with the periphery of the said disk.

2. An artillery type wheel according to claim 1, wherein the inner ends of the spokes are convexly rounded and rest in the groove of the ring as in a socket allowing tilting of the spokes to various angles.

JOSEF GREAKER.